May 24, 1932.  J. L. DRAKE  1,860,082
METHOD AND APPARATUS FOR PRODUCING SHEET GLASS
Filed Jan. 21, 1928  2 Sheets-Sheet 1
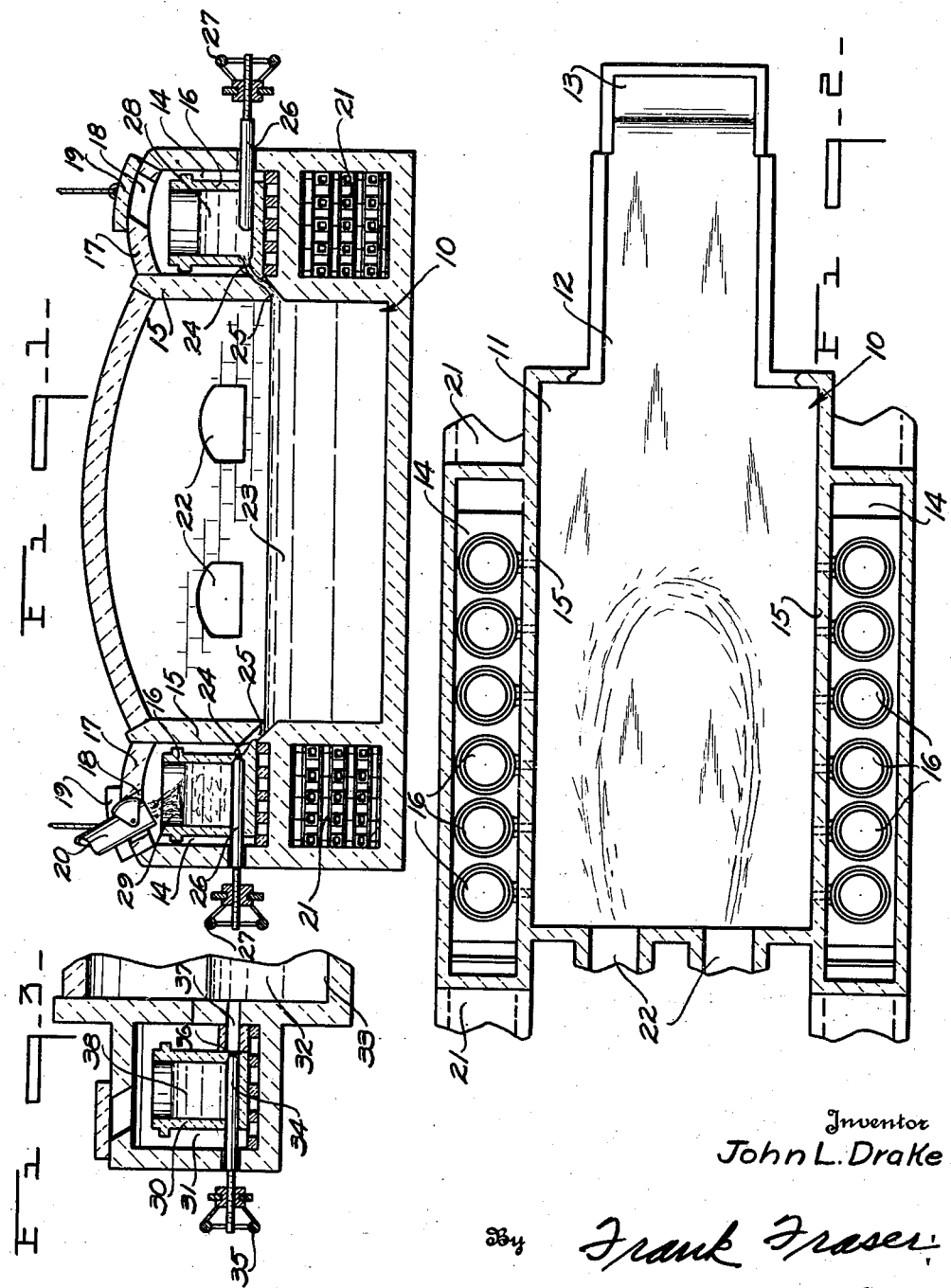
Inventor
John L. Drake
By Frank Fraser
Attorney May 24, 1932. J. L. DRAKE 1,860,082
METHOD AND APPARATUS FOR PRODUCING SHEET GLASS
Filed Jan. 21, 1928 2 Sheets-Sheet 2
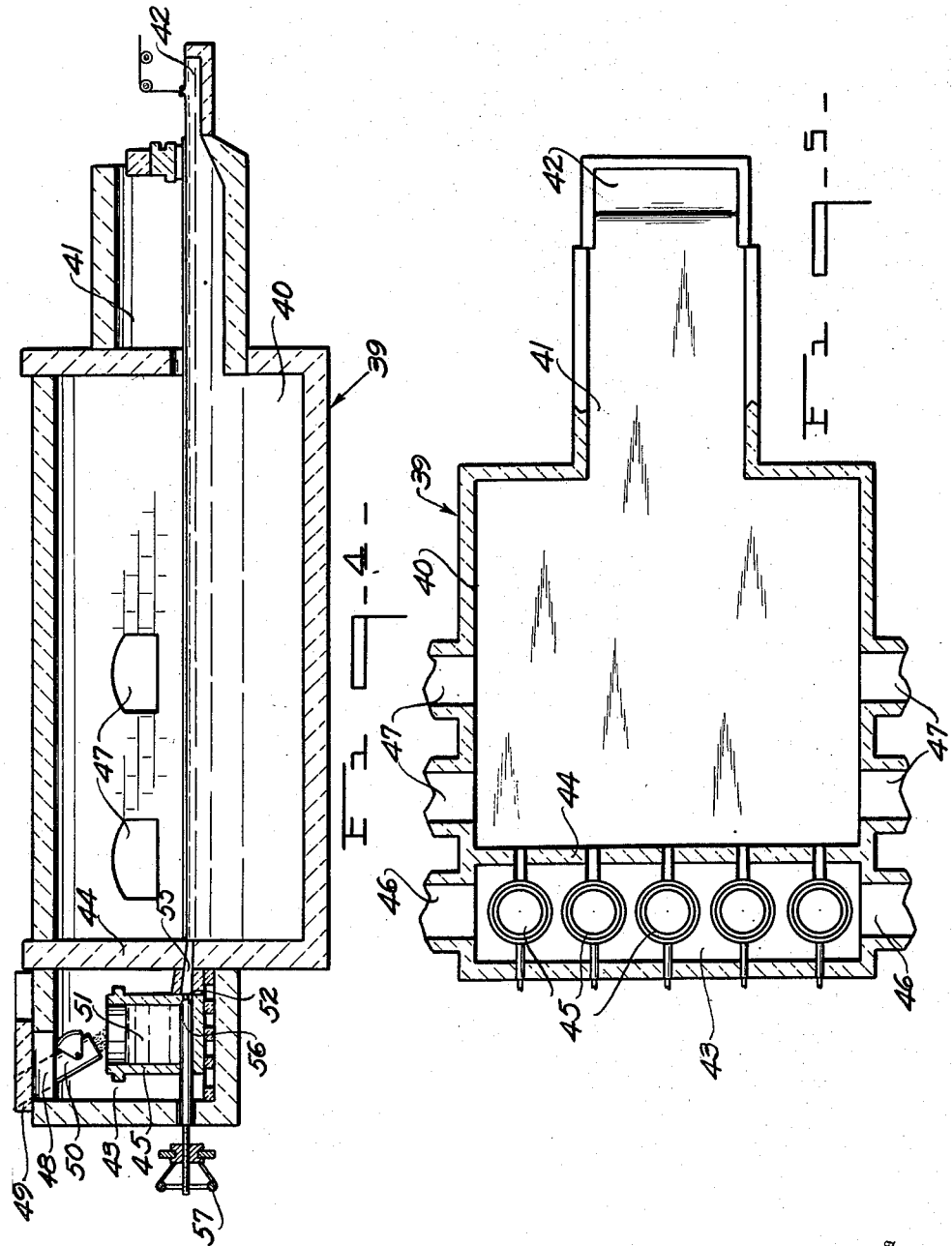
Inventor
John L. Drake
By Frank Fraser
Attorney Patented May 24, 1932

1,860,082

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR PRODUCING SHEET GLASS

Application filed January 21, 1928. Serial No. 248,477.

This invention relates to a process and apparatus for producing sheet glass.

An important object of the invention is to provide a process and apparatus for producing sheet glass wherein a sheet may be continuously produced from a mass of molten glass that has been previously melted and refined for a considerable length of time.

Another object of the invention is to provide a process and apparatus for producing sheet glass wherein a sheet of glass is continuously drawn from a mass of molten glass in a working receptacle which is prepared and supplied thereto intermittently.

Another object of this invention is to provide apparatus of the nature described wherein glass batch ingredients are melted and refined in melting receptacles and the resulting molten glass transferred into a working receptacle; the molten glass entering the molten glass receptacle being free from all common glass defects; and the molten glass being created and supplied to the working receptacle in such a manner that the latter will at all times contain the desired amount of glass thereby permitting the continuous formation of a ribbon or sheet.

Another object of the invention is to provide apparatus of the nature described wherein the melting pot containing compartment or chamber and the working receptacle containing the molten glass are located in heat transferring proximity to one another.

Still another object of the invention is to provide apparatus of this general character wherein the melting pots are located with respect to the level of the molten glass in the working receptacle that the molten glass from the pots may be flowed or transferred by gravity into the working receptacle.

Still another object of this invention is to provide apparatus of this character wherein the melting pot containing chamber is so associated with the working receptacle that the heat employed for heating the melting pots may also be utilized for heating the contents of the working receptacle.

Another object of this invention is to provide an apparatus of this character in which a plurality of melting pots are located in a compartment immediately adjacent a working receptacle; means being provided for introducing glass batch ingredients to said melting pots and for intermittently supplying refined molten glass to said working receptacle by successively flowing the molten glass from said pots to said working receptacle.

Various other objects, advantages and novel details of construction of the invention will be made more apparent as this description proceeds, especially when considered in connection with the accompanying drawings wherein:

Figure 1 is a transverse vertical sectional view through a glass forming apparatus constructed in accordance with this invention.

Figure 2 is a horizontal longitudinal sectional view through the apparatus illustrated in Figure 1.

Figure 3 is a fragmentary vertical sectional view showing a modified form of construction.

Figure 4 is a vertical longitudinal sectional view through another modified form of construction, and Figure 5 is a horizontal longitudinal sectional view of the structure shown in Figure 4.

Referring now to the drawings and more particularly to Figures 1 and 2 thereof it will be noted that there is illustrated a work or molten glass receiving receptacle indicated generally by the reference character 10 and while this receptacle may be of any desired or preferred character or shape in the form herein illustrated it includes a refining chamber 11, a cooling chamber 12 and a working end 13 from which the molten glass is drawn in sheet form.

Heretofore it has generally been the practice, in sheet glass manufacture to melt glass in one end of a continuous tank furnace and have a continuous flow movement thereof through said furnace, the glass being worked into a commercial article or articles at the opposite end thereof. However, due to the constant removal of molten glass at one end of the furnace and the constant introduction of glass batch ingredients at the opposite end the molten glass is in a continuous state of movement. Furthermore the time required or allowed in such furnaces for the melting and refining of the glass is relatively short and generally insufficient for proper conditioning. Sheet glass produced in such furnaces often contains a considerable number of seeds, blisters and other well known defects which impair the quality of the finished product and consequently its commercial value.

In accordance with the present invention it is proposed to place the glass batch ingredients in melting receptacles or pots and after the batch is melted the glass is allowed to remain in the receptacle or receptacles for a considerable length of time to give the glass a sufficient opportunity to completely refine and settle. This melted and refined glass is then introduced or transferred into the working receptacle in such a manner and in such quantities that a sufficient mass of molten glass will be created and maintained in the working receptacle that a sheet may be continuously produced or drawn therefrom.

In order to provide means for melting the glass batch ingredients and for transferring the molten glass from the pots to the working receptacle there is provided melting chambers or compartments 14, two being shown in this embodiment of the invention, arranged on opposite sides of the working receptacle and in close proximity thereto. In fact in the construction just being described the side walls 15 of the working receptacle are common to and also act as one side wall respectively of each compartment or melting chamber 14. By locating the melting chambers 14 immediately adjacent the working receptacle it is not only possible to quickly and easily transfer the molten glass from the pots to the working receptacle in a manner to be more fully hereinafter referred to but it is also possible to utilize the heat employed for heating the melting chamber to partially heat or maintain the temperature of the contents of the working receptacle. In other words it is preferable or at least highly desirable that the melting chambers 14 be located in heat transferring proximity to the working receptacle.

Each melting chamber or compartment 14 is of such a nature and size that a plurality of melting receptacles or pots 16 may be positioned therein. The roof 17 of each compartment 14 may be provided with a plurality of openings 18 controlled by suitable gates or the like 19. Glass batch ingredients may be introduced into the pots 16 by means of a spout or the like 20 introduced through the openings 18.

The melting chambers or compartments 14 are heated by recuperative furnaces 21 or by any other suitable heating means whereby the glass batch ingredients may be subjected to high temperatures to produce molten glass. As previously mentioned the heat from the melting chambers 14 also acts to heat and maintain the contents of the working receptacle at the proper temperature. Suitable ports 22 may also be provided in the wall of the working receptacle whereby additional heat may be supplied thereto from any desired or preferred means.

In the form of construction illustrated in Figures 1 and 2 the bottom of each pot or receptacle 16 is located at least slightly above the normal level of the molten glass 23 contained in the working receptacle 10. In this manner the molten glass which has been created in the pots 16 may be transferred by gravity therefrom into the working receptacle. For this purpose each of the pots 16 is shown as provided with an outlet port or opening 24 communicating with a passageway 25 formed in the adjacent wall 15. A valve member 26 operated by a mechanism 27 controls each port 24 so that the ports 24 of each pot may be opened to permit the supply of molten glass 28 contained therein to flow outwardly through port 24 and passageway 25 into the working receptacle. In Figure 1 the pot or receptacle 16 located at the right is shown as containing a mass of melted and refined molten glass 28 and the valve 26 is shown in open position whereby the mass of molten glass 28 is permitted to flow by gravity into the working receptacle. The pot 16 located at the left is having glass batch ingredients 29 introduced therein by means of the spout 20 and accordingly the valve 26 is shown in closed position. After the glass batch ingredients have been subjected to the proper temperature for a sufficient length of time to completely melt and refine the same then the valve 26 of that particular port will be opened to permit the contents thereof to flow into the working receptacle. In this way the working receptacle is intermittently supplied with completely melted and refined molten glass and in practice a sufficient number of melting receptacles will be provided to maintain the working receptacle constantly supplied with completely refined glass so that a sheet can be continuously formed from the molten glass contained in said working receptacle.

In Figure 3 a slightly modified form of construction is illustrated and this form of construction differs from the one just described principally in that the melting receptacle or pot 30 is located in the melting chamber or compartment 31 with its bottom below the normal level of the mass of molten glass 32 contained in the working receptacle 33. A valve member 34 actuated by actuating mechanism 35 controls a port 36 in the pot 30 which port communicates with a passageway 37 leading to the working receptacle. With this form of construction, when the valve 34 is opened, the mass of molten glass 38 will flow through port 36 and passageway 37 into working receptacle 33 until the level of the molten glass 38 falls to the level of the molten glass 32. By reason of this construction the lower strata only of the molten glass in each pot 30 is transferred each time the valve 34 is opened.

In Figures 4 and 5 still another form of construction is illustrated. In this particular arrangement of parts the reference character 39 indicates generally the working receptacle which is herein shown as including a refining chamber 40, a cooling chamber 41 and a working end 42 from which the molten glass is drawn in sheet form. The melting chamber or compartment 43 is shown as arranged at one end of the working receptacle with a wall 44 common to the working receptacle and melting chamber. The melting chamber 43 is of such a nature that a plurality of melting receptacles or pots 45 may be positioned therein and the melting chamber is heated by a regenerator or any other type of heating means connected thereto through ports 46. Suitable ports 47 are also provided in the walls of the working receptacle 39 connected to any desired type of heating means whereby the contents of the working receptacle may be further heated or the temperature thereof controlled. It will be understood that in this form of construction also the heat from the melting chamber 43 may be utilized for heating or raising the temperature of the contents of the working chamber and that many advantages and much economy in the use of heat is effected by locating the melting chamber in heat transferring proximity to the working receptacle.

The roof or upper wall of the melting chamber 43 may be provided with a plurality of openings 48 controlled by means of suitable gates or the like 49 and glass batch ingredients may be introduced into the several pots or receptacles 45 by means of a spout or the like 50 introduced through the respective opening 48.

In order to transfer the mass of molten glass 51 from each pot 45 into the working receptacle 40 each pot is provided with a port or outlet 52 communicating with a passageway 53 extending through wall 44 and opening into working receptacle 40. A valve 56 controls port 52 and is actuated by actuating means 57. Obviously the outlet port 52 and passageway 55 may be located below the normal level of the molten glass contained in a molten glass receptacle as shown and as also illustrated in the construction shown in Figure 3 or this port and passageway may be located above the normal level of the molten glass as shown and described in connection with the form of construction illustrated in Figures 1 and 2.

While several forms of the invention have been illustrated and described herein somewhat in detail it will be readily apparent to those skilled in this art that various other changes, modifications and re-arrangements may be resorted to without departing from the spirit and scope of this invention and to this end reservation is made to make such changes as may come within the purview of the accompanying claims.

I claim:

1. In a furnace construction, a glass working receptacle adapted to contain a mass of molten glass, a melting chamber arranged at one side of said receptacle and enclosed therewith, a vertical wall separating the working receptacle and melting chamber and constituting the outer wall of said receptacle and the inner wall of said chamber, said vertical wall having an opening therethrough, a glass melting pot arranged within said chamber above the level of the molten glass in said receptacle and being provided with an outlet adjacent the bottom thereof, said outlet facing toward the working receptacle and registering with the opening in the vertical wall, and means for controlling the flow of glass from the melting pot into the working receptacle.

2. In a furnace construction, a glass working receptacle adapted to contain a mass of molten glass, a melting chamber arranged at one side of said receptacle and enclosed therewith, a horizontal partition wall dividing the interior of said chamber into upper and lower compartments, a glass melting pot arranged within the upper compartment above the level of the molten glass in said receptacle and being provided with an outlet adjacent the bottom thereof, said outlet facing toward the working receptacle and being in communication therewith, heating means arranged within the lower compartment beneath the pot and opposite the molten glass in said working receptacle, and means for controlling the flow of glass from the melting pot into the working receptacle.

3. In a furnace construction, a glass working receptacle adapted to contain a mass of molten glass, a melting chamber arranged at one side of said receptacle and enclosed therewith, a vertical wall separating the working receptacle and melting chamber and constituting the outer wall of said receptacle and the inner wall of said chamber, said vertical wall having an opening therein, a horizontal partition wall dividing the interior of the chamber into upper and lower compartments, a glass melting pot arranged within the upper compartment above the level of the molten glass in said receptacle and being provided with an outlet adjacent the bottom thereof, said outlet facing toward the working receptacle and registering with the opening in the vertical wall, heating means arranged within the lower compartment beneath the pot and opposite the molten glass in said working receptacle, and means for controlling the flow of glass from the melting pot into the working receptacle.

4. In a furnace construction, a glass working receptacle adapted to contain a mass of molten glass, a melting chamber arranged at each side of said receptacle and enclosed therewith, vertical walls separating the working receptacle and melting chambers and constituting the outer walls of said receptacle and the inner walls of said chambers, said vertical walls having openings therethrough, a horizontal partition wall dividing the interior of each melting chamber into upper and lower compartments, a plurality of glass melting pots arranged within the upper compartment of each chamber above the level of the molten glass in said receptacle and being provided with outlets adjacent the bottoms thereof, said outlets facing toward the working receptacle and registering with the openings in the vertical walls, heating means arranged within the lower compartment of each chamber beneath the pots therein and opposite the molten glass in the working receptacle, and horizontal means operating through each melting pot for independently controlling the flow of glass therefrom into the working receptacle.

Signed at Toledo, in the county of Lucas and State of Ohio, this 20th day of January, 1928.

JOHN L. DRAKE